(12) United States Patent
Kohl et al.

(10) Patent No.: US 9,506,698 B2
(45) Date of Patent: Nov. 29, 2016

(54) ELECTRICALLY OPERABLE HEATING DEVICE

(71) Applicant: BEHR GMBH & CO. KG, Stuttgart (DE)

(72) Inventors: Michael Kohl, Bietigheim-Bissingen (DE); Karl-Gerd Krumbach, Burgstetten (DE); Thomas Spranger, Stuttgart (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 249 days.

(21) Appl. No.: 14/365,742

(22) PCT Filed: Dec. 12, 2012

(86) PCT No.: PCT/EP2012/075175
§ 371 (c)(1),
(2) Date: Jun. 16, 2014

(87) PCT Pub. No.: WO2013/087671
PCT Pub. Date: Jun. 20, 2013

(65) Prior Publication Data
US 2015/0117846 A1    Apr. 30, 2015

(30) Foreign Application Priority Data
Dec. 15, 2011 (DE) .................. 10 2011 088 773

(51) Int. Cl.
*F24H 1/10* (2006.01)
*F28D 1/03* (2006.01)
(Continued)

(52) U.S. Cl.
CPC ........... *F28D 1/0308* (2013.01); *B60H 1/2221* (2013.01); *F24H 1/121* (2013.01);
(Continued)

(58) Field of Classification Search
CPC ..... F28D 1/0303; F28D 1/0341; H05B 3/24; H05B 3/141; H05B 2203/02; H05B 2203/021; H05B 2203/023; B60H 1/2221; F24H 9/146; F24H 9/0015; F24H 9/1827; F24H 1/121; F24H 2250/04
See application file for complete search history.

(56) References Cited

U.S. PATENT DOCUMENTS 5,318,114 A * 6/1994 Sasaki ................. F28D 1/035
165/109.1
2008/0053981 A1   3/2008 Adachi et al.
(Continued)

FOREIGN PATENT DOCUMENTS

DE        39 07 179 A1   10/1989
DE        295 06 092 U1   6/1995
(Continued)

OTHER PUBLICATIONS

International Search Report, PCT/EP2012/075175, Mar. 22, 2013, 3 pgs.
German Search Report, DE 10 2011 088 773.3, Aug. 2, 2012, 8 pgs.

*Primary Examiner* — Shawntina Fuqua
(74) *Attorney, Agent, or Firm* — Paul D. Strain, Esq.; Strain & Strain PLLC

(57) ABSTRACT

The invention relates to an electrically operable heating device through which liquid flows, comprising a housing. The heating device comprises an electrically operable heating apparatus and a liquid chamber for accommodating a heat-transferring liquid. The liquid chamber has a plurality of plate pairs comprising plates connected to each other at specified distances from each other, whereby liquid flow channels can be created between the plate pairs. The electrically operable heating apparatus is designed as a heating combination having a plurality of heating elements, wherein the heating combination can be arranged between the liquid chambers by inserting the heating units into the accommodating spaces produced between the plate pairs.

17 Claims, 17 Drawing Sheets

(51) Int. Cl.
  *H05B 3/24* (2006.01)
  *F24H 1/12* (2006.01)
  *F24H 9/00* (2006.01)
  *F24H 9/18* (2006.01)
  *F24H 9/14* (2006.01)
  *B60H 1/22* (2006.01)
  *H05B 3/14* (2006.01)

(52) U.S. Cl.
  CPC ........... *F24H 9/0015* (2013.01); *F24H 9/146* (2013.01); *F24H 9/1827* (2013.01); *H05B 3/141* (2013.01); *H05B 3/24* (2013.01); *F24H 2250/04* (2013.01); *F28D 1/0341* (2013.01); *H05B 2203/02* (2013.01); *H05B 2203/021* (2013.01); *H05B 2203/023* (2013.01)

(56) References Cited

U.S. PATENT DOCUMENTS

2008/0061159 A1* 3/2008 Okano ................. B60H 1/2225
  237/12.3 A
2008/0173637 A1* 7/2008 Taguchi ................... H05B 3/50
  219/523

FOREIGN PATENT DOCUMENTS

| DE | 10 2009 042 581 A1 | 3/2011 |
| EP | 0 059 976 A2 | 9/1982 |
| EP | 0 899 985 A1 | 3/1999 |
| EP | 1 872 986 A1 | 1/2008 |
| EP | 2 642 234 A1 | 9/2013 |
| JP | 2005-142305 A | 6/2005 |
| WO | WO 2012/032944 A1 | 3/2012 |

* cited by examiner

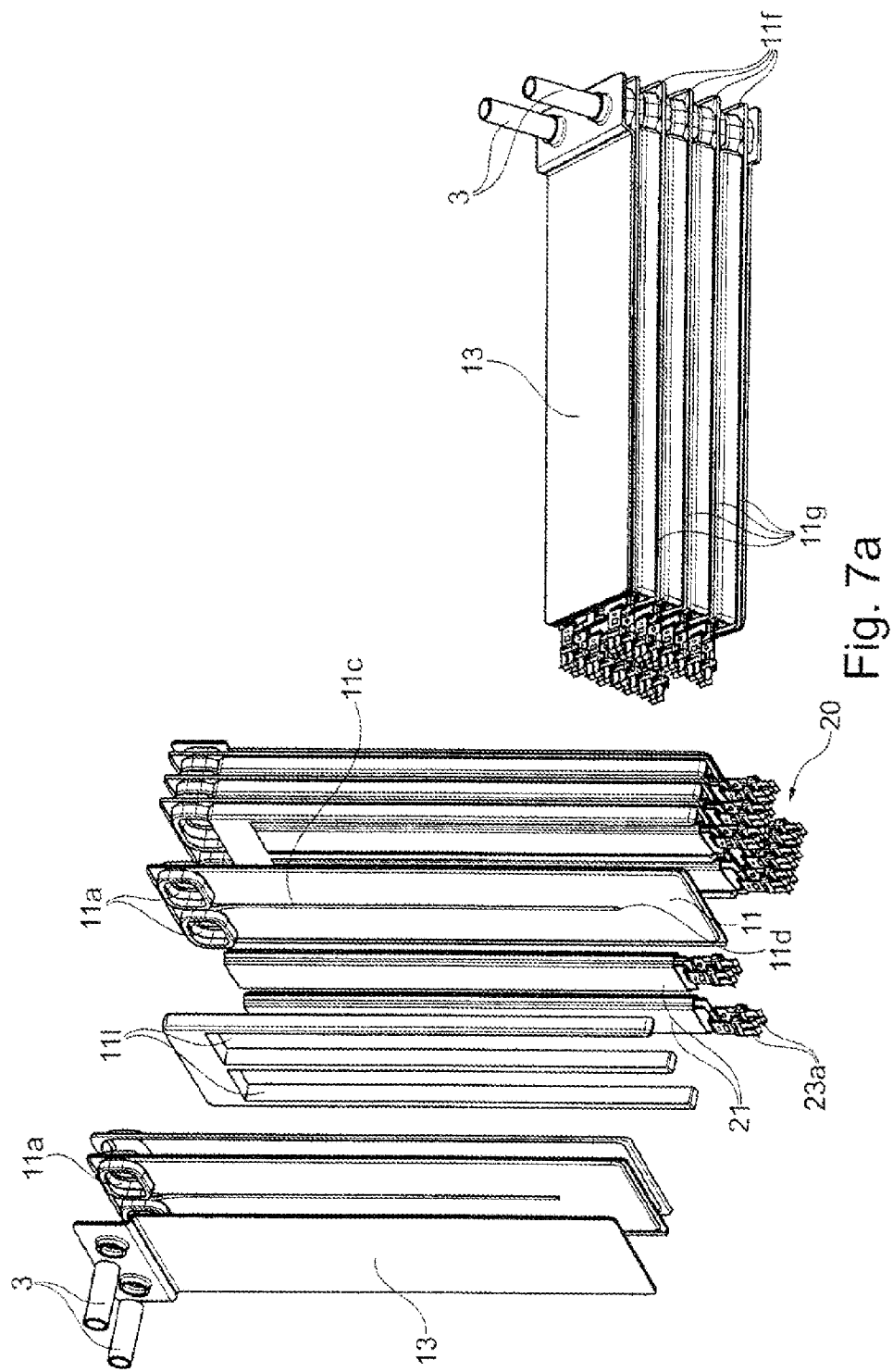

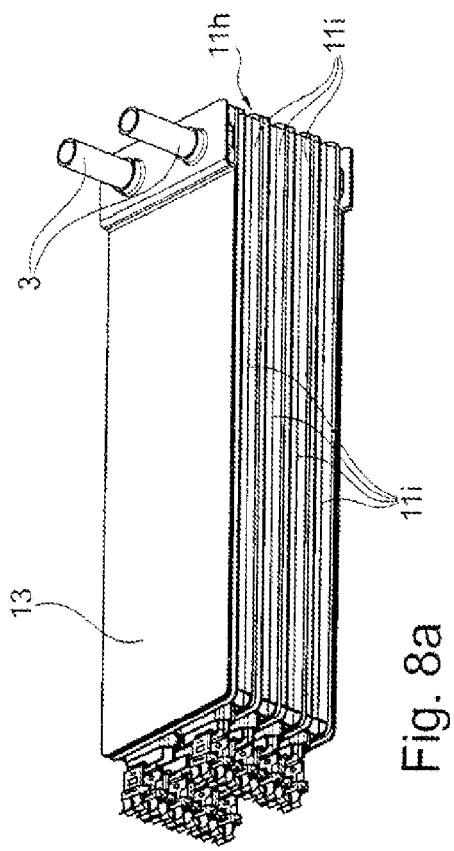
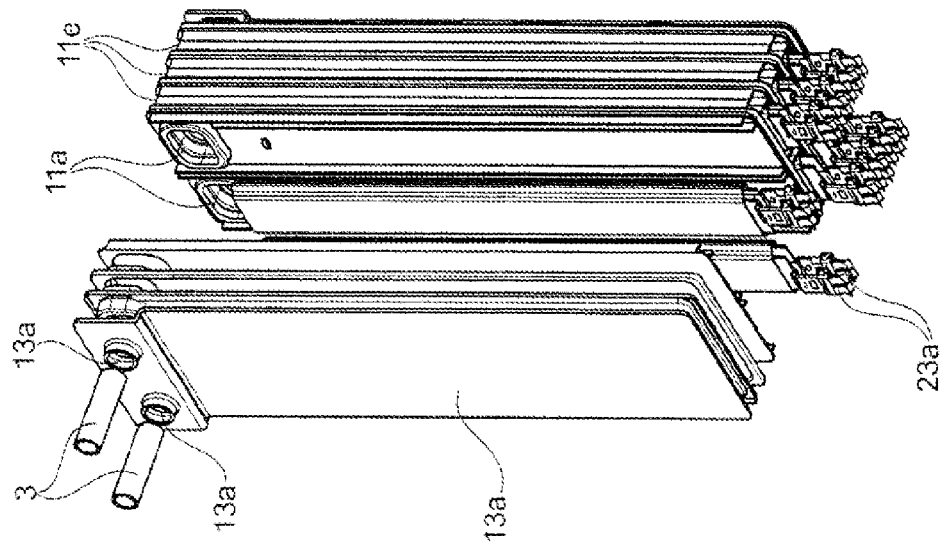
Fig. 8a

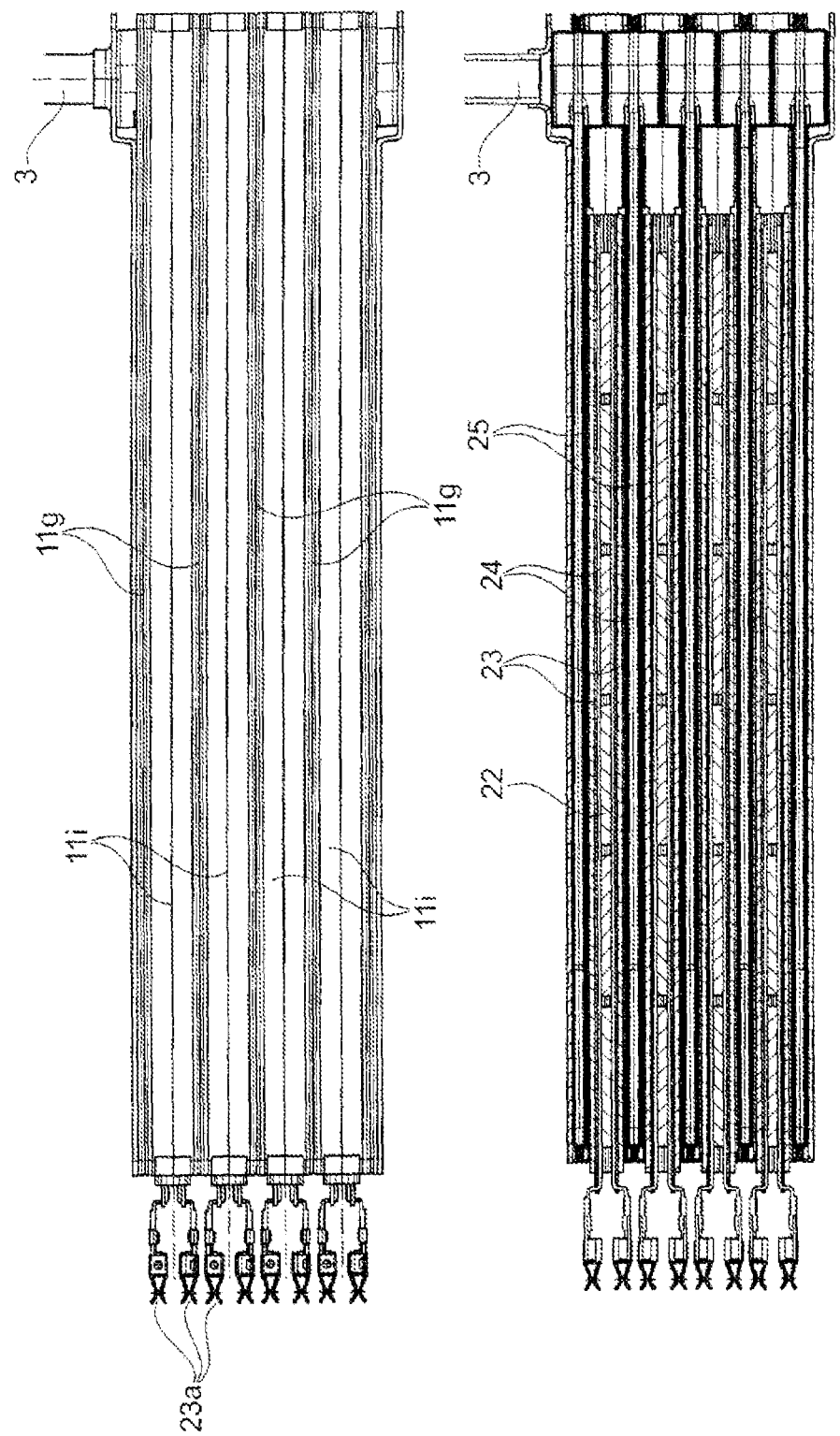

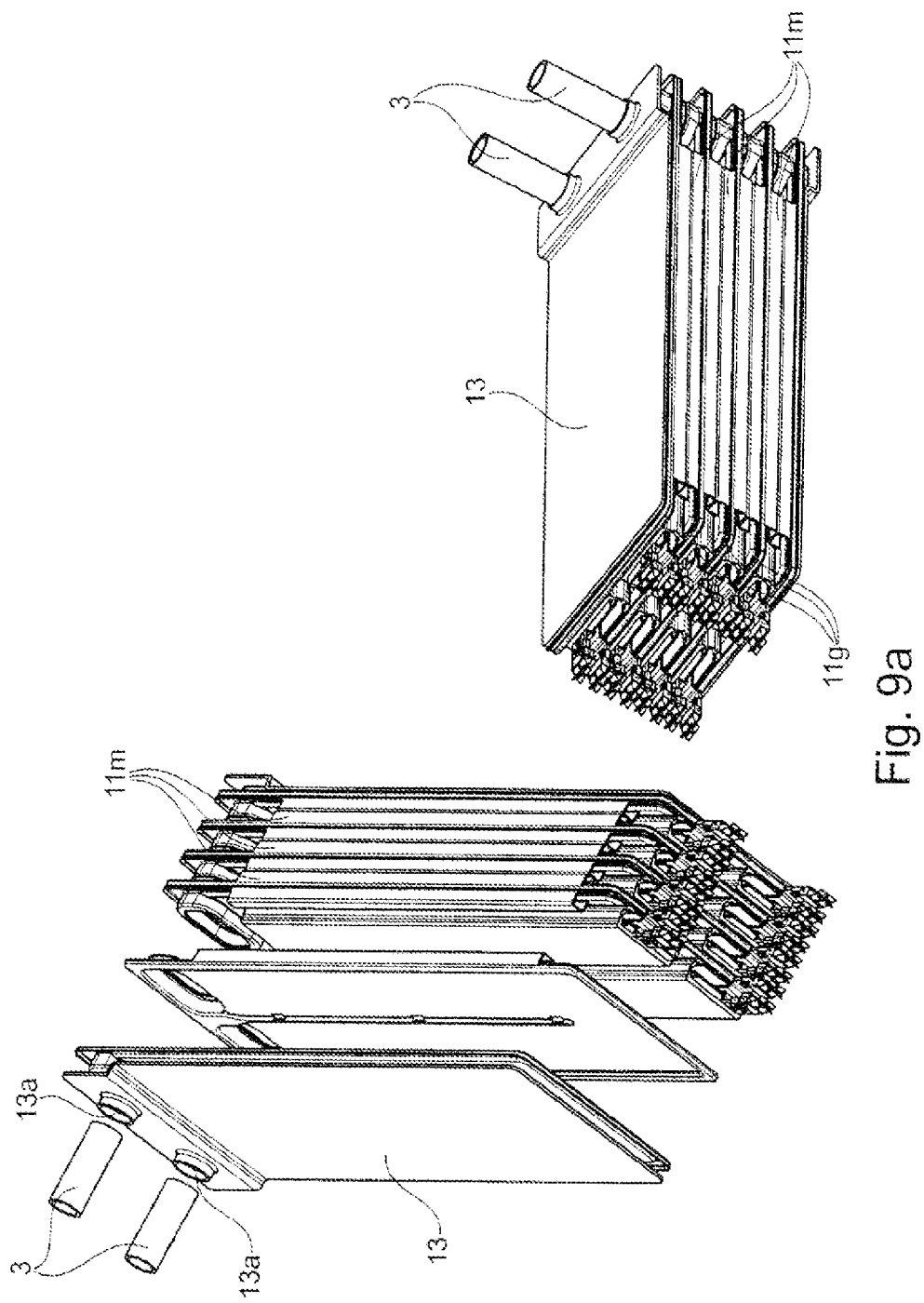

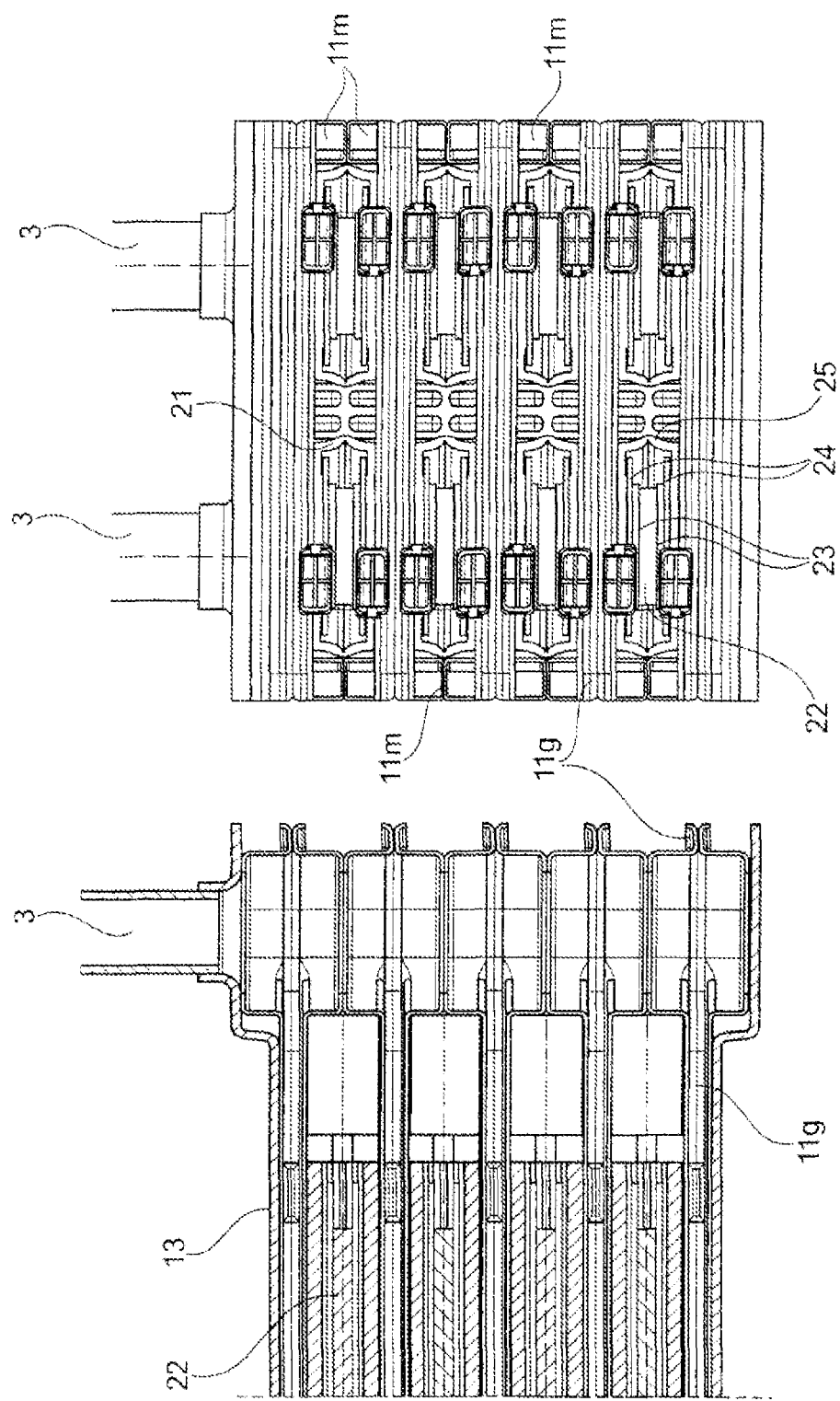

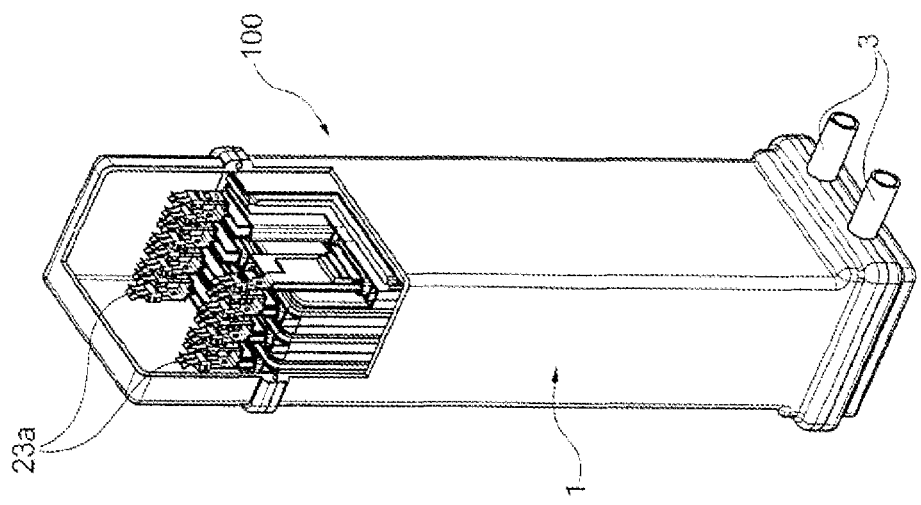
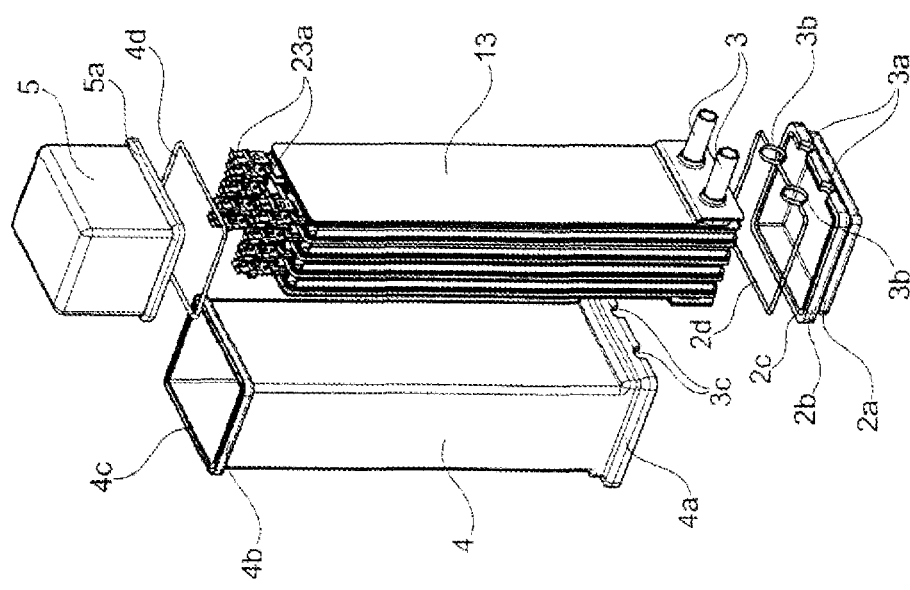
Fig. 10b

ELECTRICALLY OPERABLE HEATING DEVICE

CROSS-REFERENCE TO RELATED PATENT APPLICATIONS

This application is a National Stage of International Application No. PCT/EP2012/075175, filed Dec. 12, 2012, which is based upon and claims the benefit of priority from prior German Patent Application No. 10 2011 088 773.3, filed Dec. 15, 2011, the entire contents of all of which are incorporated herein by reference in their entirety.

TECHNICAL FIELD

The invention relates to an electrically operable heating device, in particular for motor vehicles, according to the preamble of claim 1. The heating device is arranged in a housing and comprises an electrically operable heating apparatus and a liquid chamber for accommodating a heat-transferring liquid and for allowing said liquid to flow through.

PRIOR ART

Motor vehicles with economical internal combustion engines, or what are known as plug-in hybrid electric vehicles (PHEV for short), in which the battery can be charged via a mains connection in addition to the charging of the battery as the vehicle is driven, PHEVs having what is known as a range extender for example, formed as an internal combustion engine for additional charging of the battery by means of generators, and purely electric vehicles require electric heating and/or auxiliary heating systems, in particular for heating of the passenger compartment. Auxiliary heating is necessary particularly during the start phase of the vehicle, in particular with low external temperatures.

In order to perform the function of the (auxiliary) heating, various technical solutions are known, for example by means of fuel (auxiliary) heaters, electric (auxiliary) heaters, exhaust gas heat transfer, etc. In particular, electric (auxiliary) heating appears to be advantageous because it is quickly effective, since electric power can be converted immediately into perceptible heat. In addition, electric (auxiliary) heating devices can be produced relatively cost-effectively and can be formed in a compact manner, such that they can be housed in a vehicle in a space-saving manner.

Electric (auxiliary) heating systems are particularly well suited for vehicles with hybrid drive or purely electric drive. For this application, electric powers of typically more than 3 kW are required, since these vehicles do not generally comprise a conventional coolant heating element. In such vehicles, the on-board power supply is typically more than 60 V, sometimes even greater than 300 V. Due to the required high heating powers at the (auxiliary) heating device, this is usually also operated with the high voltage so as to keep the current strength as low as possible.

Such an electric (auxiliary) heating device must comprise reliable protection against accidental contact, such that an endangerment during operation/maintenance is ruled out. All electrically conductive and externally contactable parts of the electric (auxiliary) heating device must therefore be formed in an isolated manner. In addition, the high-voltage unit of the electric (auxiliary) heating device has to be encapsulated in a dust-tight and watertight manner.

Two different technical principles of operation are known for electric (auxiliary) heating devices:

The electric power is conducted directly into the (liquid) coolant. Reference is then also made to "coolant-side (auxiliary) heating devices".

The electric power is transferred to the air. Reference is then also made to "air-side (auxiliary) heating devices".

Air-side (auxiliary) heating devices act more quickly in terms of their heating function, since the electric energy is converted completely with a degree of efficacy of 100% into a warming of air. However, an air-side (auxiliary) heating device is only suitable for warming an interior of a vehicle.

In addition, an air-side (auxiliary) heating device is advantageously integrated in a vehicle interior, in particular in an associated air-conditioning device. However, an integration of a high-voltage component in the interior is considered by many vehicle manufacturers to be safety-critical. In particular, a local vicinity here of high-voltage components to a coolant-conveying evaporator comprising flammable coolants is considered to be dangerous and should be avoided where possible.

Air-side (auxiliary) heating devices thus have a series of disadvantages:

They only enable the possibility of heating an interior, and do not provide any possibility of warming or heating a battery (in the case of a purely electric vehicle).

The space for the installation of an air-side (auxiliary) heating device has to be provided in the interior or in an air-conditioning device of a vehicle. If an additional water-side heating element is also provided, an integration of both heat exchangers in one air-conditioning device may be difficult or even impossible due to reasons of space.

For an air-side (auxiliary) heating device, there are increased demands on the homogeneity of the temperature profile in the outside space, since an inhomogeneity has a perceptible effect on the temperature distribution in the interior space.

Therefore, existing air-conditioning devices have to be modified or newly devised for an integration of an air-side (auxiliary) heating device.

In addition, there are fundamental acceptance problems for an integration of a high-voltage component in the interior of a vehicle.

Coolant-side (auxiliary) heating devices act more slowly and less efficiently in terms of their heating function, since the electrical energy is first used to warm the liquid coolant, for example in a small coolant circuit.

Hereinafter, liquid coolant will be understood to be constituted by water. All following embodiments, however, can be transferred to a liquid coolant in general.

The warmed water is used at a separate water/air/heat exchanger in order to warm air flowing into the vehicle passenger compartment. However, there is no high-voltage component arranged in the vehicle interior. The water-side (auxiliary) heating device can additionally be fitted at various positions outside the interior.

Due to the use of a known water/air/heat exchanger, a currently conventional air-conditioning device (without high-voltage components) can be transferred and reused in a practically unmodified manner in a water-side high-voltage heating system.

Compared with air-side (auxiliary) heating devices, water-side (auxiliary) heating devices additionally have the advantage that they are suitable for warming or heating or for chilling or cooling a battery by means of their water circuit (in the case of a purely electric vehicle), and in particular are also suitable for storing braking energy.

Electrically operable water-side (auxiliary) heating devices for internal combustion engines (in 13 V embodiment) have long been known from the prior art. In addition to their low-voltage design, these heating devices, however, have comparatively low electric heating powers, approximately between 600 W and 1500 W.

As a result, water-side low-voltage (auxiliary) heating devices were supplanted by air-side (auxiliary) heating devices.

However, in particular since the introduction of vehicles having a hybrid or a purely electric drive, the need for efficient electric heating devices has grown. In order to meet this need, water-side high-voltage (auxiliary) heating devices in particular appear to be suitable and therefore constitute an important technical alternative to air-side high-voltage (auxiliary) heating devices.

DE 39 07 179 discloses an electric heating device having a housing in which a plurality of PTC heating elements is arranged, wherein the liquid medium (here water) to be heated flows directly around said heating elements. The electric connection elements leading to the electric heating elements are exposed in the heating medium, which is contrary to conventional safety requirements and also involves a high likelihood of corrosion of metal parts of the connection elements. This technical solution therefore appears to be unsuitable.

A water-side high-voltage (auxiliary) heating device comprising a solid cast body is known from EP 1 872 986. The cast body is formed with U-shaped recesses, which project into liquid chambers. Insulated heating elements are arranged on either side in these chambers.

The water-side (auxiliary) heating device proposed in EP 1 872 986 is disadvantageously very heavy due to its design with a solid cast body. In addition, due to a relatively small contact area between the cast body and water, only a relatively poor mutual transfer of heat is possible, which necessitates a high number of heating elements. If the heating elements are formed as PTC elements, these in turn severely limit the heating power due to the mutual density of their arrangement, which has a detrimental effect on the total heating power attainable.

The water-side disclosed in EP 1 872 986 is thus technically disadvantageous on account of its complex structure with a heavy cast body and a high number of necessary heating elements, and is additionally costly in terms of its production.

DISCLOSURE OF THE INVENTION, PROBLEM, SOLUTION, ADVANTAGES

On the whole, the problem addressed by the invention is that of providing an improved water-side (auxiliary) heating device, in particular for motor vehicles, with which the disadvantages of the known (auxiliary) heating devices are overcome. Here, the term "heating device" will be used hereinafter and also includes an "auxiliary heating device".

In accordance with a sub-problem addressed by the invention, it is desirable in particular for the heating device to be formed as an independent heater for electric vehicles and plug-in/range extender vehicles and to be suitable for high-voltage operation from more than 60 V to more than 500 V. It is also desirable for the heating device to be capable of producing heating powers of 5 kW and more and to be constructed in a modular manner. The heating device must meet the conventional safety requirements.

The problem is solved with an electrically operable water-side heating device having the features of claim 1. The heating device is arranged in a housing and comprises an electrically operable heating apparatus and a liquid chamber for accommodating a heat-transferring liquid. The liquid chamber has a plurality of plate pairs consisting of plates connected to one another at predefined distances from one another, whereby liquid flow channels can be produced between the plate pairs. The electrically operable heating apparatus is formed as a heating composite having a plurality of heating units. The heating composite can be arranged between the liquid chambers by inserting the heating units into the accommodating spaces produced between the plate pairs.

A large contact surface for heat transfer is thus advantageously provided between heating units and the heat-transferring liquid.

The heating elements and the liquid flow channels are typically insulated with respect to one another electrically and in a fluid-tight manner.

Electrical supply, in particular by means of high-voltage, and cooling liquid are thus reliably separated from one another.

In addition, the plates typically have an inlet opening and an outlet opening in order to allow heat-transferring liquid to flow into the liquid channels, and preferably furthermore have a separating web starting from the inlet opening and the outlet opening, the separating web having an end at which heat-transferring liquid flowing through can be diverted from an inflow direction into an outflow direction.

Each two plates forming a plate pair are preferably soldered to one another.

A stable connection between the plates of a plate pair is thus advantageously ensured.

It is additionally preferable for the heating elements to be arranged in a sheathing and to have PTC elements arranged centrally between two contact electrodes. Here, an electrical insulation is preferably provided between the contact electrodes and the sheathing.

It is thus advantageously made possible for the heating device, in particular the heating elements, to be operable without risk, even at high-voltage.

The housing is preferably constructed of a number of housing parts, which can be interconnected in a dust-tight and fluid-tight manner via seal elements.

The construction from a number of housing parts facilitates a modular construction of the heating device. Due to the sealed joining of the housing parts, effective protection of the heating device is ensured inwardly and outwardly (in particular with respect to the discharge of cooling liquid).

The plates, in regions of their inlet and outlet openings, preferably have plate dishes, by means of which plates, arranged adjacently in the heating device, of different plate pairs are distanced from one another.

A joining, in particular soldering, of plates to be joined together to form plate pairs with mutual spacing between the plate pairs by means of insert parts that can be inserted during the joining process and then removed again is thus advantageously facilitated.

In accordance with an embodiment of the invention plates, arranged adjacently in the heating device, of different plate pairs are distanced from one another by insert parts connected permanently to the plates, in particular soldered to the plates.

The arrangement of the plates and plate pairs when these are joined together is thus advantageously stabilized as preparation for the installation in a heating device according to the invention.

For this embodiment it is preferable if an insert part connected, in particular soldered, to plates has two spacing edge bars and preferably one central spacing bar, at which said insert part is joined, in particular soldered, to plates of plate pairs, such that insertion compartments are produced between the spacing bars and the adjacent plates of the plate pairs. These insertion compartments are also defined as an accommodating space.

The insertion of the heating units between the plate pairs is thus advantageously facilitated.

In accordance with another embodiment of the invention plates, arranged adjacently in the heating device, of different plate pairs are distanced by means of spacing elements, which are integrated with the plates, are deformed from the plates by folding, and in particular are formed as spacing bars or nubs.

This embodiment is advantageously characterized in that the spacing elements or spacing bars can be produced already during the manufacture of the plates and no further process step is necessary for the mutual joining.

Further advantageous embodiments, by means of which in particular the aforementioned sub-problems are also solved, are described by the following description of the figures and by the dependent claims.

BRIEF DESCRIPTION OF THE DRAWINGS

The invention will be explained in greater detail hereinafter on the basis of at least one exemplary embodiment with reference to the drawings, in which:

FIG. 7a shows, in a stack arrangement and a perspective expanded view, an illustration for the integration of a heating composite according to FIG. 6 between plate pairs that have been distanced during their mutual joining in accordance with the first approach variant of FIG. 4, FIG. 8a shows, in a stack arrangement and a perspective expanded view, an illustration for the integration of a heating composite according to FIG. 6 between plate pairs that have been distanced during their mutual joining in accordance with the second approach variant of FIG. 5, FIG. 8b shows, for the exemplary embodiment according to FIG. 8a in a plan view of the longitudinal side and in a sectional illustration, the arrangement of the heating units with sheathings between the plate pairs, FIG. 9a shows, in a stack arrangement and a perspective expanded view, an illustration for the integration of a heating composite according to FIG. 6 between plate pairs that have been distanced during their mutual joining in accordance with a third approach variant, FIG. 9c shows detailed views of FIG. 9a and FIG. 9b in two cross-sectional views oriented perpendicularly to one another, FIG. 10b shows, in a schematic expanded perspective view and a partly cut-away view, an illustration for the integration of plate pairs and a heating composite having heating units in a housing for manufacture of a heating device according to FIG. 1.

PREFERRED EMBODIMENT OF THE INVENTION

Figure 1:
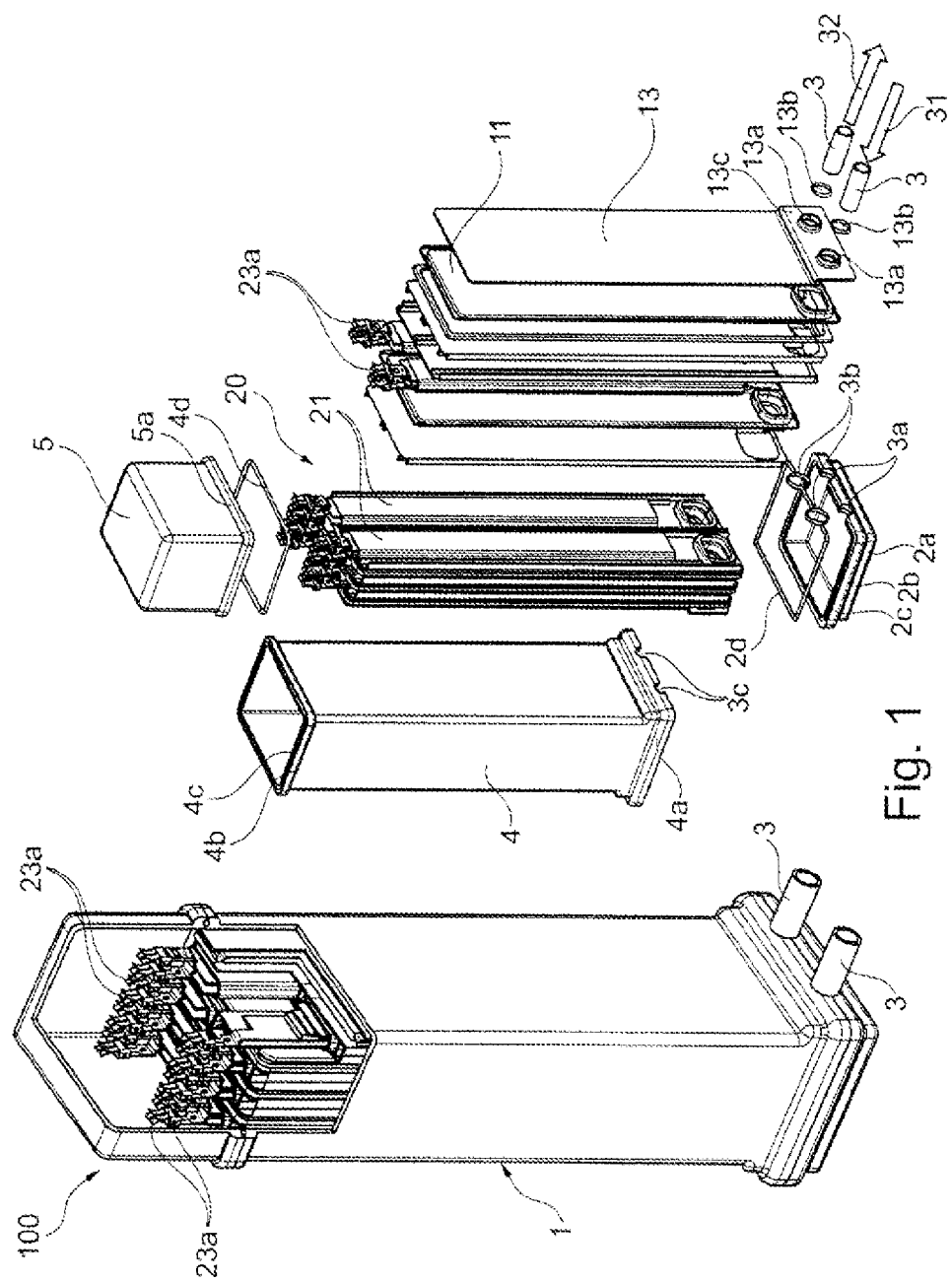
FIG. 1 shows a schematic partly cut-away illustration and an expanded perspective illustration of a first exemplary embodiment of an electrically operable heating device according to the invention, through which liquid is passed.

FIG. 1 shows a schematic partly cut-away illustration and an expanded perspective illustration of a first exemplary embodiment of an electrically operable heating device 100 according to the invention, through which liquid is passed, the heating device being suitable in particular for motor vehicles.

The heating device 100 has a housing 1, which is preferably manufactured from plastic or metal and, in this example, is formed in a number of parts as a hollow cuboid, with a pedestal part 2, a middle part 4 and a top part 5.

In this example, the pedestal part 2 has a base part 2a and a connection part 2b with a peripheral groove 2c and two semi-circular recesses 3a for accommodating inlet and outlet connection pieces 3 for feeding and discharging a liquid medium as cooling liquid, wherein the base part 2a and the connection part 2b are preferably formed and manufactured integrally with one another. A seal element 2d formed in a manner complementary to the groove 2c can be inserted into the groove 2c and can be fitted onto the connection part 2b, wherein the connection part 2b has two circular aperture rings 3b, which are formed in a manner complementary to the semicircular recesses 3a.

In this example, the middle part 4 has a lower end part 4a with a peripheral groove (not illustrated) formed in a manner complementary to the shape of the seal element 2d and two semicircular recesses 3c for accommodating the inlet and outlet connection pieces 3, preferably made of aluminium.

The middle part 4 with its lower end part 4a is formed such that it can be joined in a sealed manner to the pedestal part 2, the seal being provided via the seal element 2d.

In addition, the middle part 4 by way of example has an upper end part 4b with a peripheral groove 4c, into which a seal element 4d formed in a complementary manner can be inserted.

The middle part 4 is preferably formed and produced in one piece with its lower end part 4a and its upper end part 4b.

A top part 5 having a lower end part 5a, which is provided with a peripheral groove (not illustrated), into which the seal element 4d can be inserted, whereby the upper part 5 can be connected in a sealed manner to the middle part 4, can be fitted onto the middle part 4.

It is noted that the cuboid design of the housing 1 and components thereof with a square or rectangular cross section and also circular liquid apertures both in this exemplary embodiment and in exemplary embodiments yet to follow is purely exemplary and can be replaced by other cross-sectional configurations, for example elliptical, polygonal or any other type.

FIG. 1 further shows, in the expanded illustration on the right-hand side of the figure, a heating composite 20 formed in a manner suitable for the heating device according to the invention and having a plurality of heating units 21, which have electrode connections 23a at one end.

Plates 11 for regulating the coolant circulation with liquid flow channels producible therebetween are illustrated further to the right in the expanded illustration, wherein each plate 11 at a lower end has openings 11a for allowing the passage of cooling liquid in a flow direction compatible with an inlet direction 31 and an outlet direction 32. The plates 11 are preferably manufactured from aluminium.

In addition, two heating units 21 are illustrated, which are inserted between adjacent plates 11 and a side part 13, preferably likewise made of aluminium, with a lower end part 13c for forming a boundary of the plates 11 in a liquid chamber in the housing 1 of the heating device 100. The pedestal part 13c has two openings 13a formed in a manner complementary to the openings 11a in the plates 11, the connection pieces 3 for the liquid inlet and outlet being connectable to said openings 13a via seal elements 13b.

Figure 2:
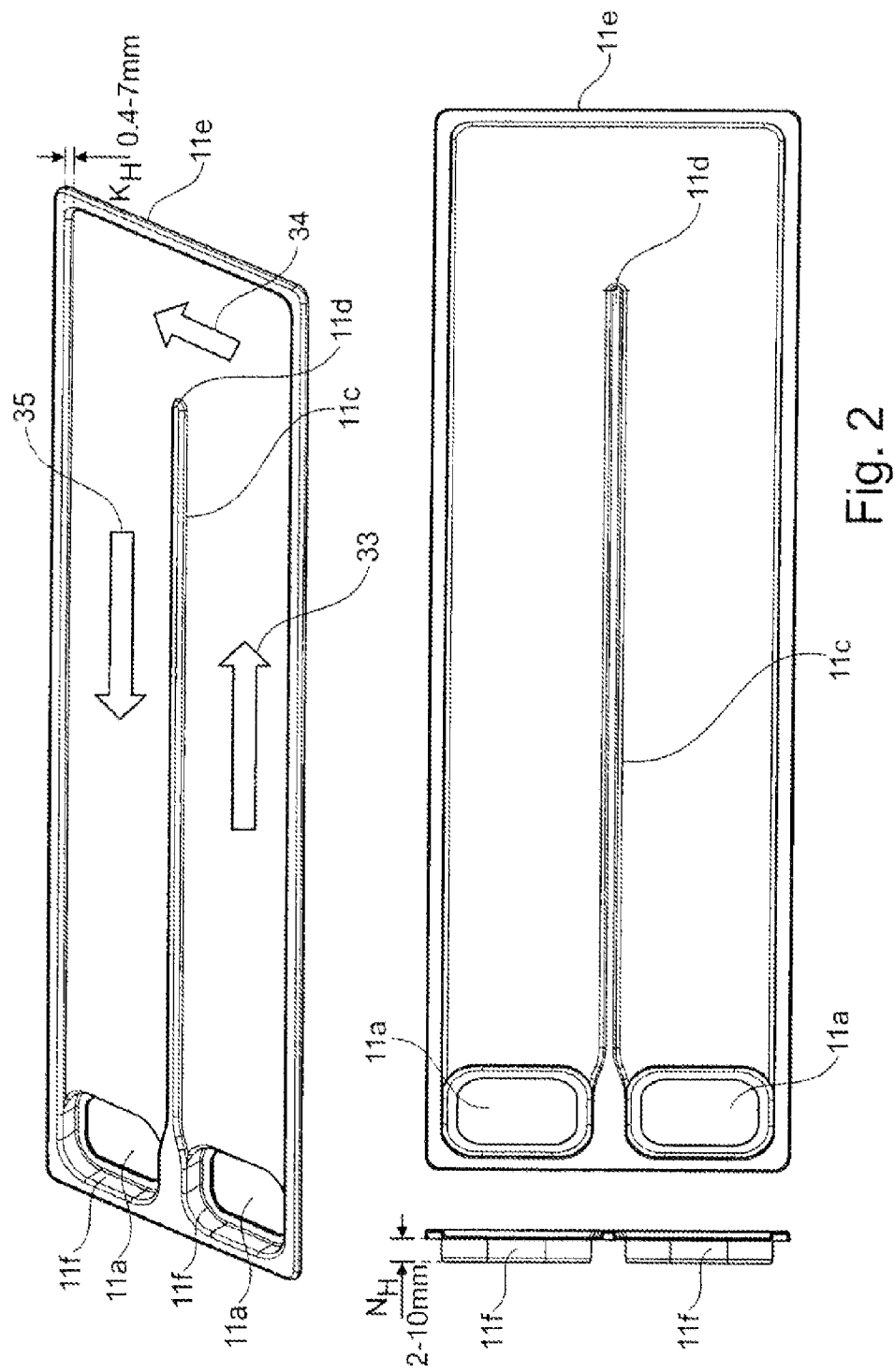
FIG. 2 shows a perspective slanted view and plan view of a plate of the heating device from FIG. 1.

FIG. 2 shows a plate 11 of the heating device 100 from FIG. 1 in a perspective slanted view and in plan view. A separating web 11c is formed in the middle of the plate 11 and starts from the middle between the openings 11a, with a separating web end 11d before the plate end 11e opposite the inlet openings 11a. The inlet openings 11a are provided with dishes 11f, with a height $N_H$ from preferably 2 mm to 10 mm, the dishes being provided for a connection, preferably soldering, of adjacent plates 11, to be arranged in the heating device 100, so as to form a plate pair 11g (see FIG. 3).

A heating device according to the invention preferably contains 2 to 20 plate pairs 11g. In order to space the plate pairs 11g during the connection, in particular soldering, various technical solution variants are available, which will also be explained in greater detail with reference to the following figures:

use of a reusable insert part, for example made of carbon-fiber-reinforced graphite, which is removed once the connection has been produced, spacing by means of an insert part to be used, in particular to be soldered, permanently, spacing by means of spacing elements, for example formed as nubs or bars, which are arranged permanently on the outer edge of a plate 11 and can be produced by deforming the plate 11.

A plate pair 11 produced from two plates 11 connected, in particular soldered, to one another constitutes a closed fluid channel with a deflection of the liquid flow "over the depth" (see below). The height of such a fluid channel is preferably approximately 0.8 to 14 mm.

The separating web 11c is provided in order to deflect, in a deflection direction 34 at the separating web end 11d, a cooling liquid flowing in from an inflow direction 33 in a liquid flow channel that is to be produced between the plates and then to deflect said cooling liquid in an outflow direction 35, such that it is possible to produce a flow around the separating web 11c, in other words "over the depth" between the plates 11.

Figure 3:
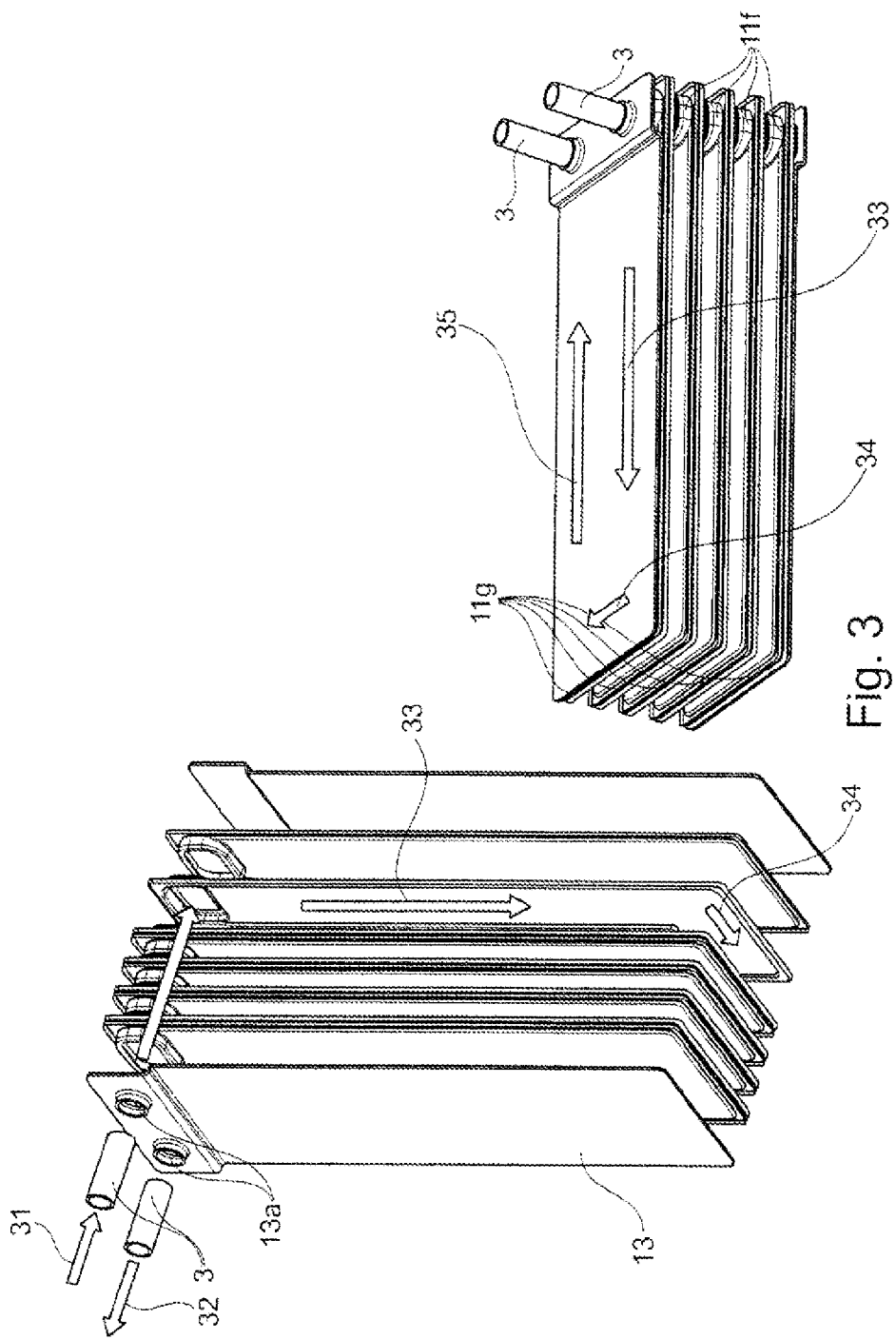
FIG. 3 shows a stack arrangement of plates according to FIG. 2 joined together to form plate pairs and illustrates the arrangement of adjacent plate pairs in the heating device from FIG. 1.

FIG. 3 shows a stack arrangement of plates 11 according to FIG. 2 joined together to form plate pairs 11g and illustrates the arrangement of adjacent plate pairs 11g in the heating device 100 of FIG. 1. Cooling liquid flows through adjacent plate pairs 11g parallel to one another in the operating state, as indicated by the flow direction arrows 33, 34 and 35.

Figure 4:
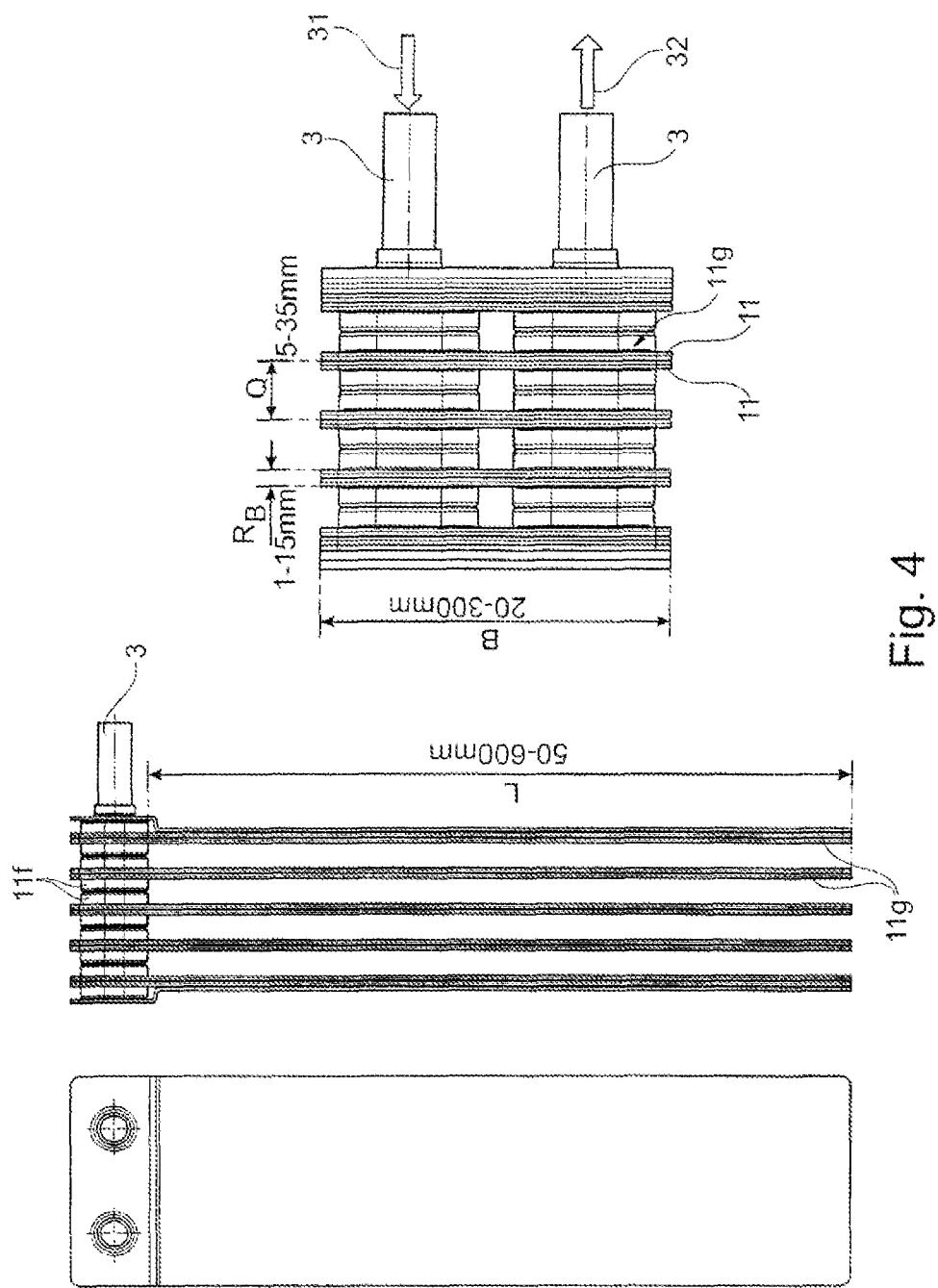
FIG. 4 shows an arrangement of plates joined together to form plate pairs with mutual spacing by means of a first approach during the joining process.

FIG. 4 shows an arrangement of plates 11 joined together to form plate pairs 11g with mutual spacing of the plate pairs 11g by means of insert parts, which are inserted during the joining process and then removed again and therefore are not shown in this illustration. The removable and therefore reusable insert parts for the plate pair spacing during the step of the connection, in particular soldering, of the plates 11 to form plate pairs 11g are produced for example from carbon-fiber-reinforced graphite (CFC). The thickness of such a reusable insert part preferably corresponds to approximately twice the height $N_H$ of a dish 11f. Once the plates 11 have been connected to form plate pairs 11g, the outer plate pair thickness $R_B$ is preferably 1 mm to 15 mm, with a spacing Q between the plate pair centers, also referred to as a "transverse separation Q", from preferably 5 mm to 35 mm in the assembled state. The plates 11 preferably have a length L from 50 mm to 60 mm and a width from 20 mm to 300 mm.

The reusable insert parts are used for force transmission, in particular tensioning, during the connection, in particular soldering, and thus enable a stable connection, in particular soldering, of the plates 11 peripherally relative to one another and of the dishes 11f relative to one another. In particular when connecting by means of soldering, a soldered group formed from plates 11 soldered to form plate pairs 11g and from plate pairs 11g soldered to one another at the dishes 11f is fluid-tight and functional.

Figure 5:
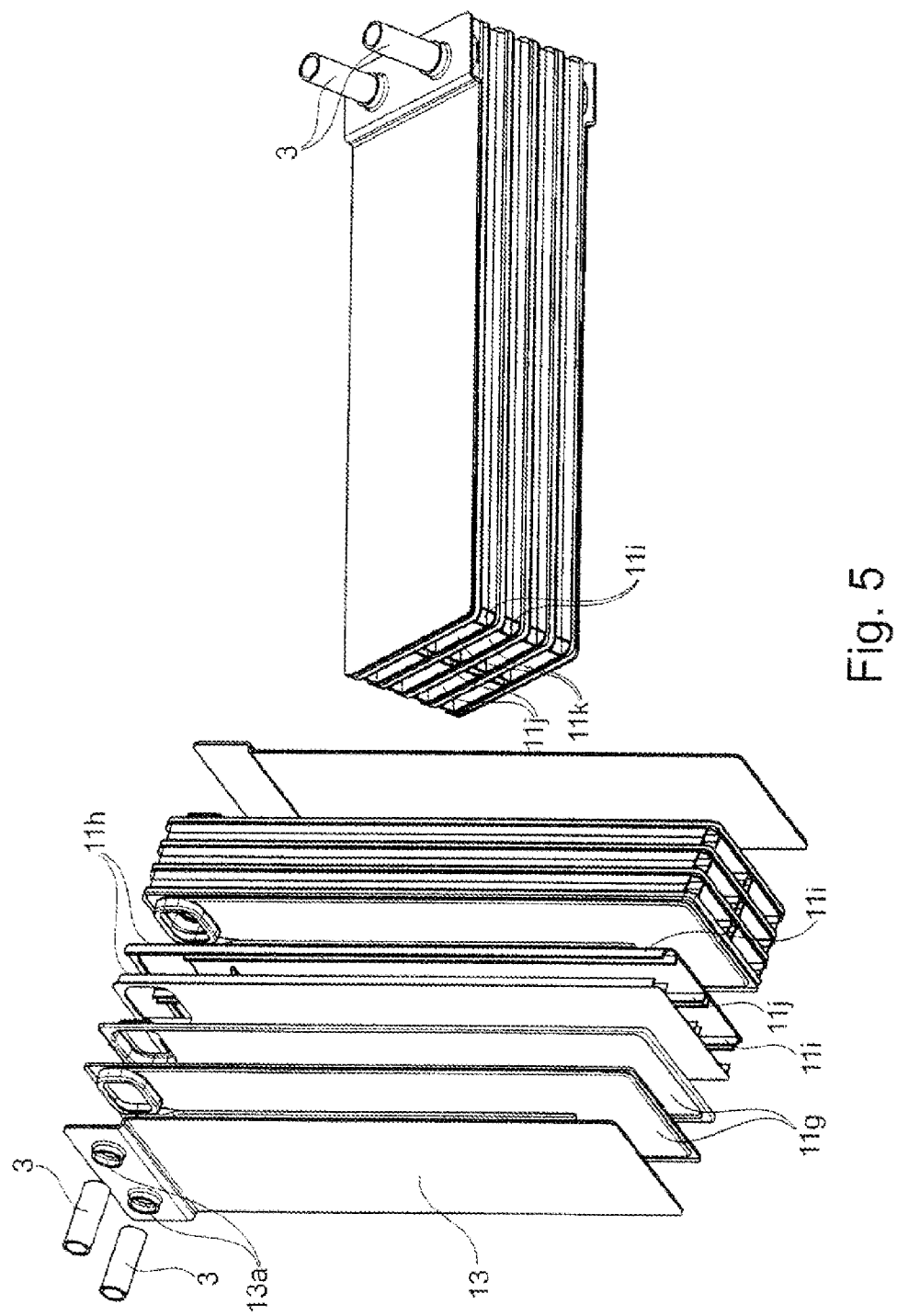
FIG. 5 shows a stack arrangement of plates according to FIG. 2 joined together to form plate pairs, with mutual spacing by means of a second approach and illustrates the arrangement of adjacent plate pairs in the heating device of FIG. 1.

FIG. 5 shows a stack arrangement of plates 11 according to FIG. 2 joined together to form plate pairs 11g with mutual spacing by means of permanently inserted, in particular soldered, insert parts 11h and illustrates the arrangement of adjacent plate pairs 11g in the heating device 100 from FIG. 1.

The insert parts 11 are preferably manufactured from aluminium and are formed in a manner geometrically complementary to the plates 11 or plate pairs 11g, that is to say with identical longitudinal sectional geometries, and in the illustrated example have spacing edge bars 11i and a spacing middle bar 11j formed in a rail-like manner and running parallel to the longitudinal edges of the plates 11, such that, once an insert part 11h has been connected to a plate 11, two insertion compartments 11k, also referred to hereinafter as "mounting compartments 11k", running parallel to the spacing bars 11i can be produced separately from one another by the spacing middle bar 11*j* so as to enable an insertion of heating units of the heating composite.

Together with their spacing bars 11*i*, 11*g*, the inset parts 11*h* have a thickness corresponding to the height of the plate dishes, that is to say preferably from 2 mm to 10 mm.

The insert parts 11*h*, at their contact faces formed by the spacing bars 11*i*, 11*j*, are preferably soldered to plates 11, wherein different insert parts 11*h* are not to be soldered to one another.

The permanently connected insert parts 11*h* are used for force transmission, in particular tensioning, during the connection, in particular soldering, and thus enable a stable connection, in particular soldering, of the plates 11 peripherally relative to one another and of the dishes 11*f* relative to one another. In particular in the case of connection by soldering, a soldered group formed from plates 11 soldered to form plate pairs 11*g* and from plate pairs 11*g* soldered to one another at the dishes 11*f* and also from a soldered insert part 11*h* is fluid-tight and functional.

Figure 6:
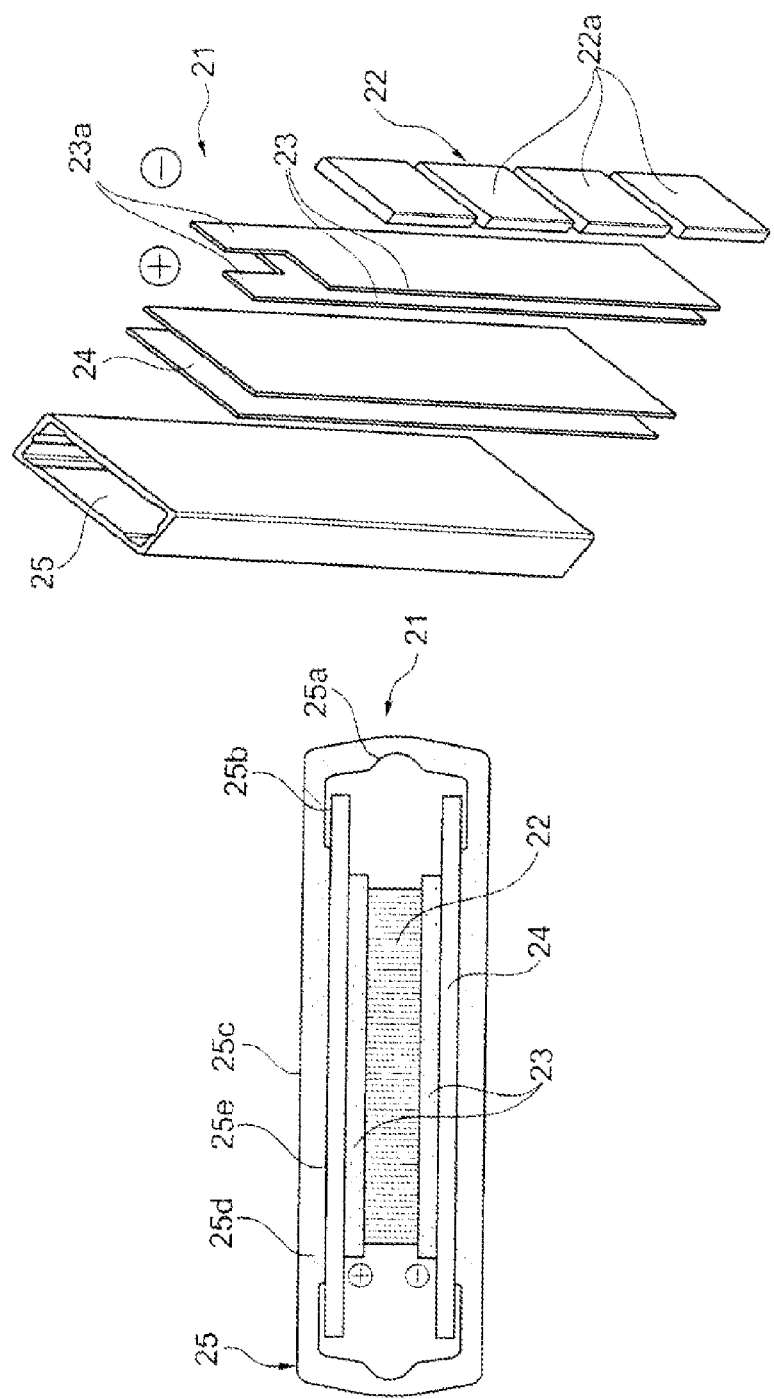
FIG. 6 shows a longitudinal sectional illustration and a perspective expanded illustration of an exemplary structure of a heating unit of a heating composite for the heating device from FIG. 1.

FIG. 6, in a longitudinal sectional illustration and a perspective expanded illustration, shows an exemplary construction of heating units 21 of a heating composite 20 for the heating device 100 from FIG. 1.

A heating element 22, preferably comprising a plurality of PTC elements 22*a*, is arranged centrally in the heating units 21. PTC (positive temperature coefficient) elements, for example manufactured from electrically conductive ceramic substrates, are current-conducting materials, which conduct electric current better at low temperatures than at high temperatures; this is because their electrical resistance increases with rising temperature. Resistors of this type therefore have a positive temperature coefficient, in other words the conducted current strength and therefore heating power produced becomes lower with rising temperature, such that PTC heating elements automatically act in a "limiting" manner.

In order to supply current to the heating element 22, the heating element 22 is connected in accordance with this example at the longitudinal sides in an electrically contacting manner to two contact electrodes 23, for example made of non-ferrous metal, which comprise outer electrode connections 23*a*. The heating element 22 with the associated contact electrodes 23 is arranged in a sheathing 25, which is cuboidal in this example, wherein the contact electrodes 23 are electrically insulated by insulation elements 24 with respect to the inner wall 25*e* of the wall 25*d* of the sheathing 25. The insulation elements 24 are preferably manufactured in an electrically insulated manner from ceramic or silicone film, and the sheathing is preferably manufactured from aluminium or non-ferrous metal.

The wall 25*d* of the sheathing 25 further has press regions 25*c* so as to enable a contact pressure in the direction of the heating element 22 for the purpose of improving the heat transfer, and has kink regions 25*a* and heel regions 25*b* relative to the insulation elements 24 in order to protect against a bending stress.

FIG. 7*a* shows, in a stack arrangement (to the right) and a perspective expanded view (to the left), an illustration for the integration of a heating composite 20 according to FIG. 6 between plate pairs 11*g*, which have been distanced during their mutual joining in accordance with a first approach variant. To this end, reusable insert plates 11*l* were inserted between the plate pairs 11*g* during the step of the connection, in particular soldering, of plates 11 to form plate pairs 11*g* between the plate pairs 11*g* and were removed again after the connection step (see also FIG. 4).

The heating units 21 of prefabricated heating composites 20 are inserted, starting at the open sides, between spaced plate pairs 21*g*, wherein the electric contact side of the heating composite 20 with the electrode connections 23*a* is oriented opposite the water connection side of the plate pairs 21, on which side the plate pairs are soldered to one another at the dishes 21*f*. For insertion of the heating units 21, the insert openings can be bent open slightly where necessary, since the plate pairs are only connected on the opposite side. Once the heating composite 20 with the heating units 21 has been inserted, the plate pairs 21*g* are pressed together again.

A positioning frame 15 is preferably used for the correct positioning of the heating units 21 and can be subsequently inserted or soldered to the plates 11 or plate pairs 11*g* (see also FIG. 7*b* and FIG. 7*c*).

In the operating state of the heating device, the electrically produced heat is transferred from the sheathings 25 of the heating units 21, said sheathings preferably being formed with a rectangular cross section, to the plate pairs 11*g*, which in particular are soldered, and from there into the coolant.

Figure 7B:
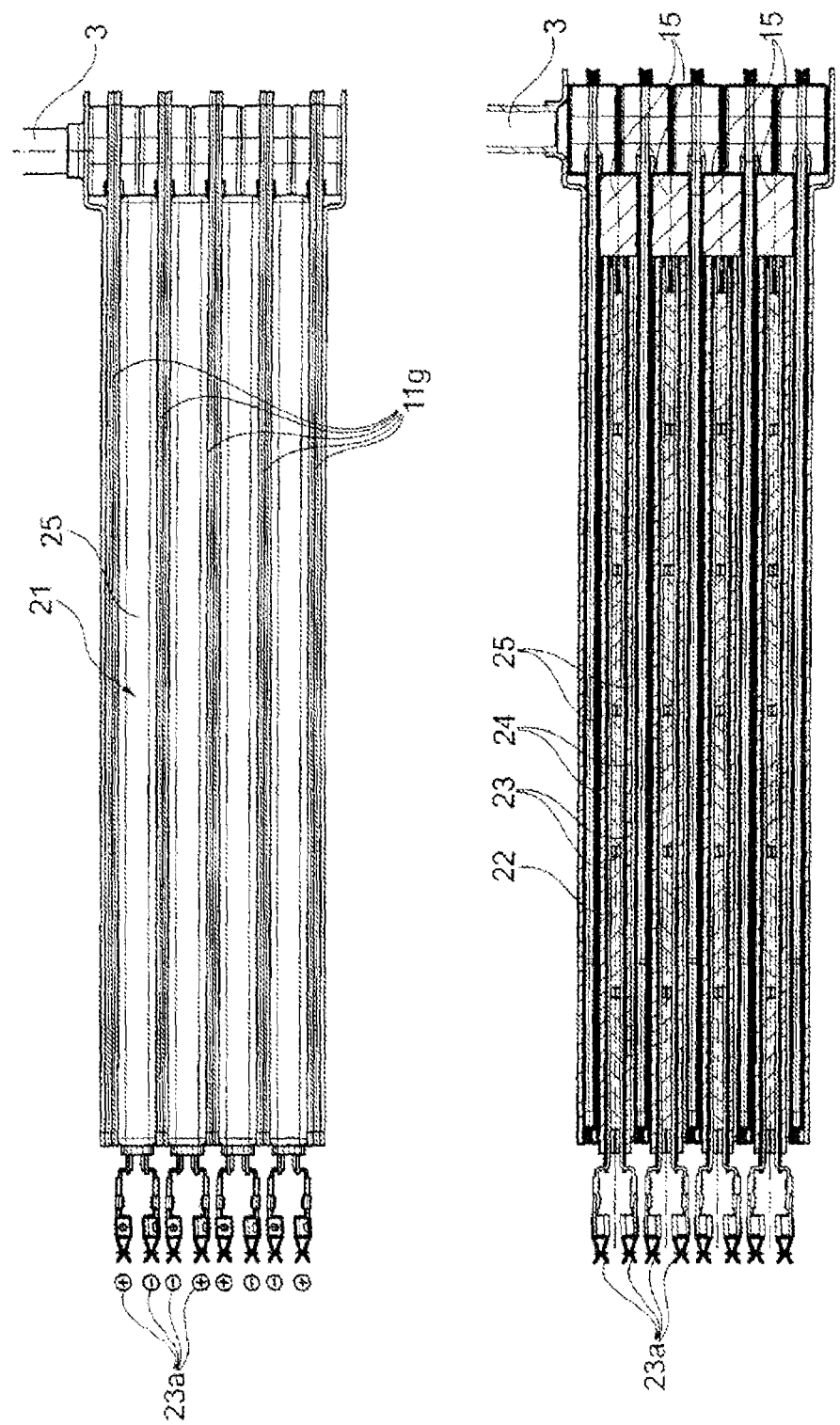
FIG. 7b shows, for the exemplary embodiment according to FIG. 7a in a plan view on the longitudinal side and in a cross-sectional illustration, the arrangement of the heating units with sheathings between the plate pairs.

FIG. 7*b* shows, for the exemplary embodiment according to FIG. 7*a* in a plan view of the longitudinal side and in a sectional illustration, in the same orientation, the arrangement of the heating units 21 with sheathings 25 between the plate pairs 11*g*, in the longitudinal expansion between the electrode connections 23*a* on the left-hand side of the figure and the water connection side with a connection piece 3 for a liquid inlet or liquid outlet on the right-hand side. Parts 15 of a positioning frame, which is provided for targeted positioning of the heating units 21 between the plate pairs 11*g*, are also indicated.

Figure 7C:
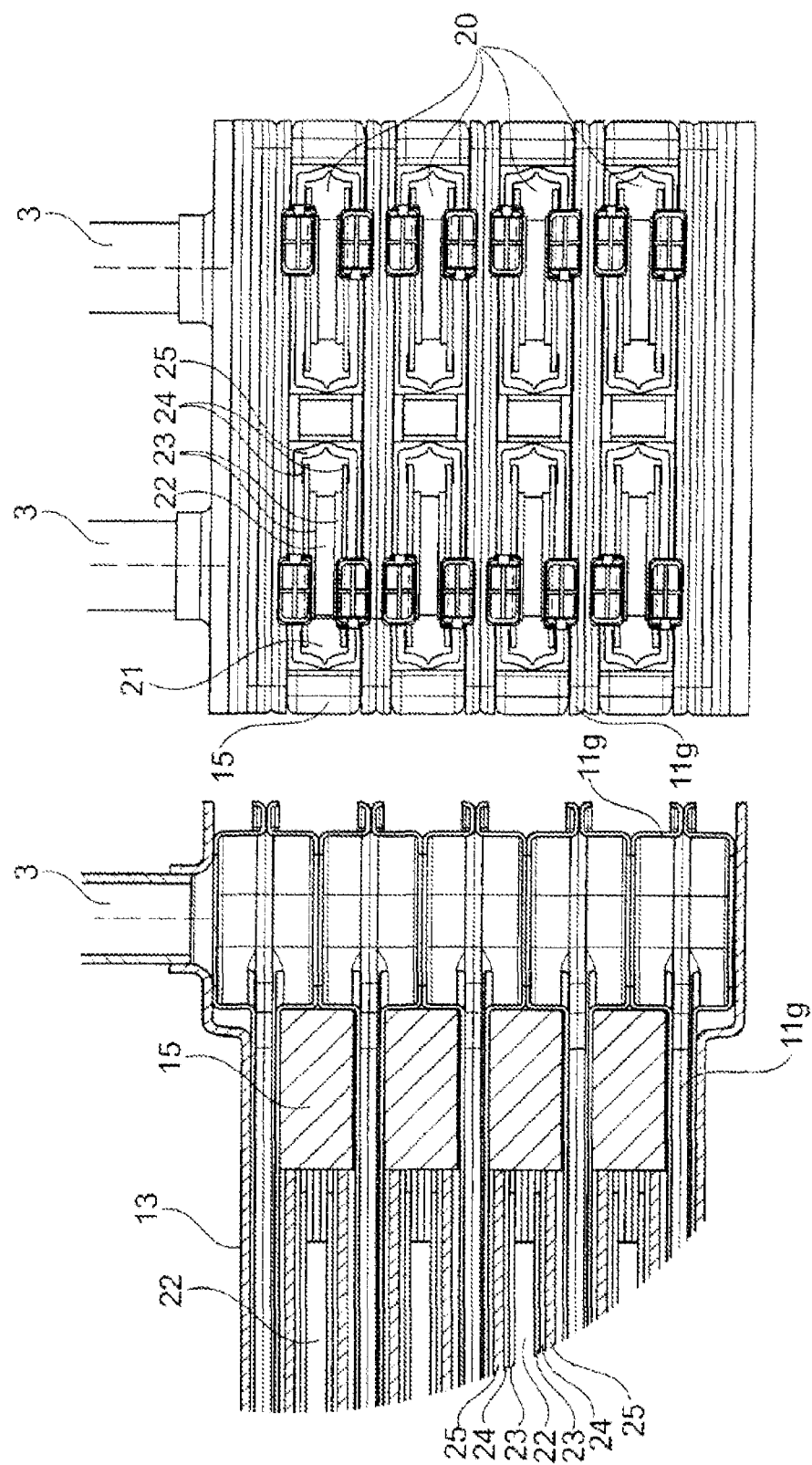
FIG. 7c shows detailed views of FIG. 7a and FIG. 7b in two cross-sectional views oriented perpendicularly to one another.

FIG. 7*c* shows, in detailed views of FIG. 7*a* and FIG. 7*b* in cross-sectional views oriented perpendicularly to one another, an illustration for the integration in a heating device 100 according to FIG. 1 of a heating composite 20 according to FIG. 6 between plates 11 according to FIG. 4 distanced by insert parts inserted during the mutual connection of said plates and then removed again.

FIG. 8*a* shows, in a stack arrangement (to the right) and in a perspective expanded illustration (to the left), an illustration for the integration of a heating composite 20 having heating units 21 according to FIG. 6 between plate pairs 11*g*, which have been permanently distanced during the mutual joining thereof in accordance with a second approach variant (see also above with respect to FIG. 5). To this end, insert parts 11*h*, preferably each comprising two spacing edge bars 11*i* and a central spacing bar 11*j*, were joined, in particular soldered, to plates 11 of plate pairs 11*g* between the plate pairs 11*g* during the step of connection, in particular soldering, of plates 11 to form plate pairs 11*g* between the plate pairs 11*g*, such that insertion compartments 11*k* were produced between the spacing bars 11*i*, 11*j* and the adjacent plates 11 of the plate pairs 11*g*.

The heating units 21 of prefabricated heating composites 20 are inserted, starting at the open sides, between spaced plate pairs 11*g* into the insertion compartments 11*k*, wherein the electric contact side of the heating composite 20 with the electrode connections 23*a* is again oriented opposite the water connection side of the plate pair 11*g*, on which side the plate pairs 11*g* are soldered to one another at the dishes 11*f*. In the case of this variant also, the insertion compartments 11*k* can be bent open slightly where necessary in order to insert the heating units 21, since the plate pairs are only connected on the opposite side. Once the heating composite has been inserted, the soldered group is pressed together again in accordance with the description relating to FIG. 5.

A positioning frame 15a, in particular formed as an optionally spring-loaded stenter frame, is preferably used for the correct positioning of the heating units 21 and for producing mechanical tension for permanent contacting between the heating units 21 of the heating composite 20 and plates 11 of the plate pairs 11g, which can subsequently be inserted or soldered to the plates 11 or plate pairs 11g (see also FIG. 8b and FIG. 8c). Alternatively, permanent contact between the heating units 21 of the heating composite 20 and the plates 11 is also possible by means of adhesive bonding, for example with use of a silicone adhesive or an epoxy adhesive.

FIG. 8b shows, for the exemplary embodiment according to FIG. 8a in a plan view of the longitudinal side and in a sectional illustration, in the same orientation, the arrangement of the heating units 21 with sheathings 25 between the plate pairs 11g in the longitudinal expansion between the electrode connections 23a on the left-hand side of the figure and the water connection side with the connection piece 3 for liquid inlet or outlet on the right-hand side.

Figure 8C:
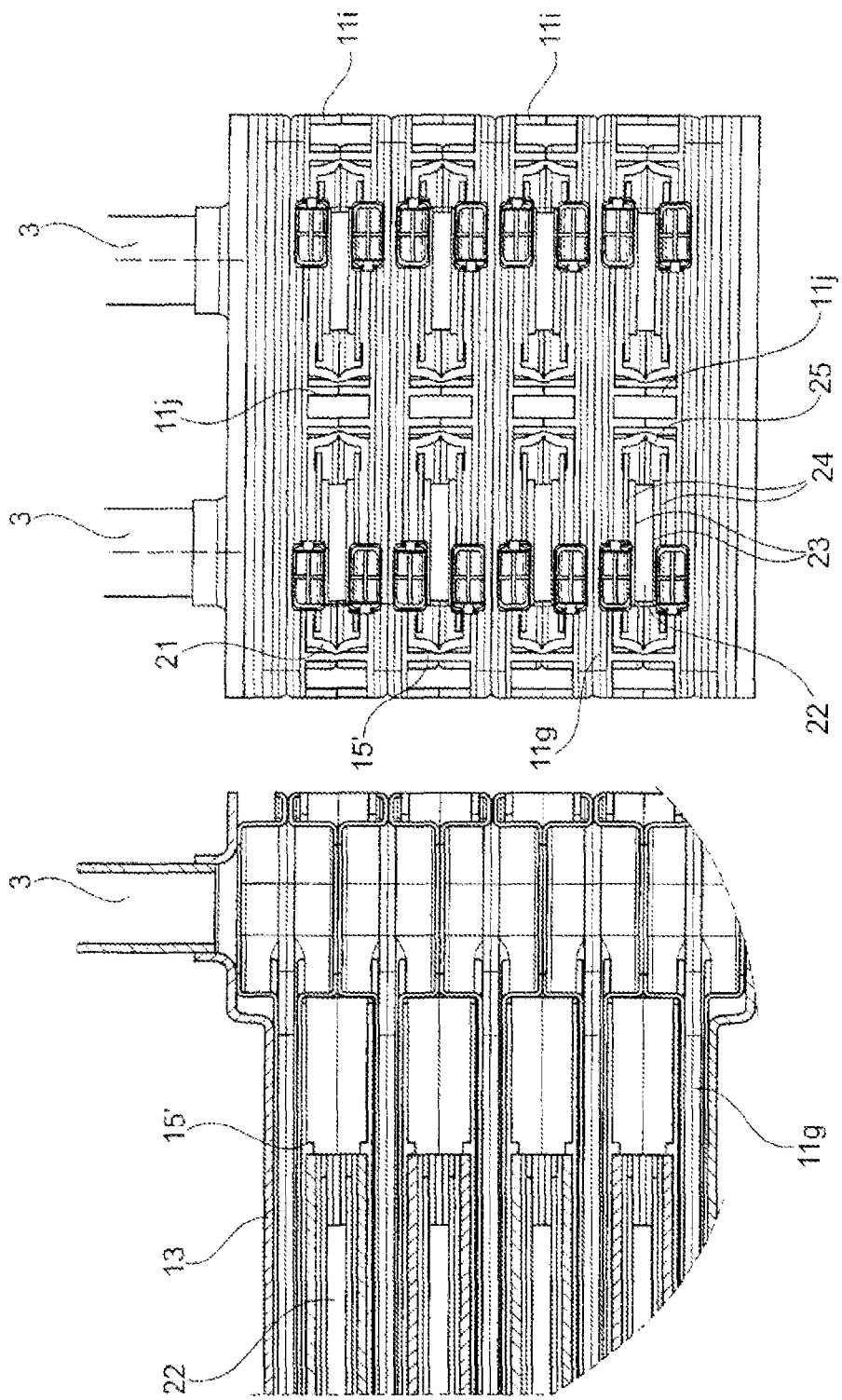
FIG. 8c shows detailed views of FIG. 8a and FIG. 8b in two cross-sectional views oriented perpendicularly to one another.

FIG. 8c shows, in detailed views of FIG. 8a and FIG. 8b in two cross-sectional views oriented perpendicularly to one another, an illustration for the integration of a heating composite 20 according to FIG. 6 between plate pairs 11g, which have been permanently distanced during the mutual joining thereof, as described beforehand. Parts 15' of a positioning frame, which is provided for targeted positioning of the heating units 21 between the plate pairs 11g, are also indicated.

Instead of the formation of the heating units in a sheathing, these may also be arranged without a sheathing, wherein the heating units are then introduced between the elements provided therefore, optionally with electrical insulation.

Figure 9B:
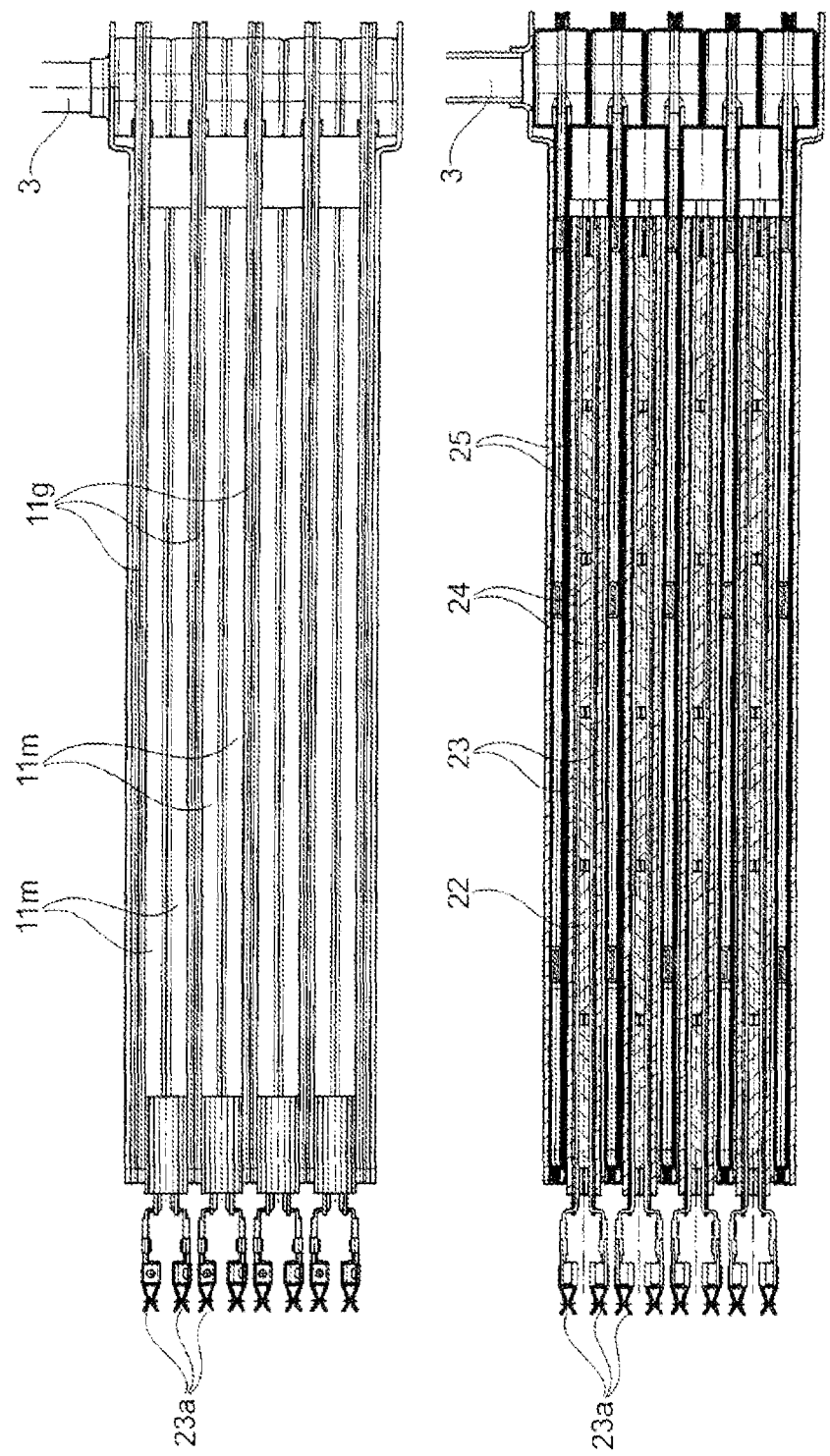
FIG. 9b shows, for the exemplary embodiment according to FIG. 9a in a plan view of the longitudinal side and in a sectional illustration, the arrangement of the heating units with sheathings between the plate pairs.

FIG. 9a shows, in a stack arrangement (to the right) and a perspective expanded view (to the left), an illustration for the integration of a heating composite 20 according to figure between plate pairs 11g, which have been permanently distanced during the joining thereof in accordance with a third approach variant. To this end, (integrated) spacing elements are formed at the edges of the plates 11, distanced from one another, of the plate pairs 11g and may be deformed from plates 11 by folding and for example can be formed as (integrated) spacing bars 11m or nubs.

The integrated spacing elements 11l are used for force transmission, in particular tensioning, during the connection, in particular soldering, and thus enable a stable connection, in particular soldering, of the plates 11 peripherally relative to one another and of the dishes 11f relative to one another. Integrated spacing elements to be arranged adjacently in the heating device are likewise permanently connected, in particular soldered, to one another.

Due to the integrated spacing elements formed in particular as spacing bars 11m or as nubs, rigid insertion compartments, cooperating with associated plates 11 and also referred to as "mounting ducts", are produced.

The heating units 21 of prefabricated heating composites 20 are inserted, starting at the open sides, between adjacent plate pairs 11g into the insertion compartments, wherein the electric contact side of the heating composite 20 with the electrode connections 23a is again oriented opposite the water connection side of the plate pairs 11g, on which side the plate pairs 11g are soldered to one another at the plate dishes. Following the insertion of the heating composite 20 having heating units 21, the soldered group formed from plates 11 soldered to form plate pairs 11g with their integrated spacing elements 11m and from plate pairs 11g soldered to one another at the dishes is pressed together.

A positioning frame, in particular formed as an optionally spring-loaded stenter frame, is preferably used for the correct positioning of the heating units 21 and for generating mechanical tension for permanent contacting between the heating units 21 of the heating composite 20 and plates 11 of the plate pairs 11g, which can subsequently be inserted or soldered to the plates 11 or plate pairs 11g (see also FIG. 8a and FIG. 8b). Alternatively, permanent contact between the heating units 21 of the heating composite 20 and the plates 11 is also possible by means of adhesive bonding, for example with use of a silicone adhesive or an epoxy adhesive.

Figure 10A:
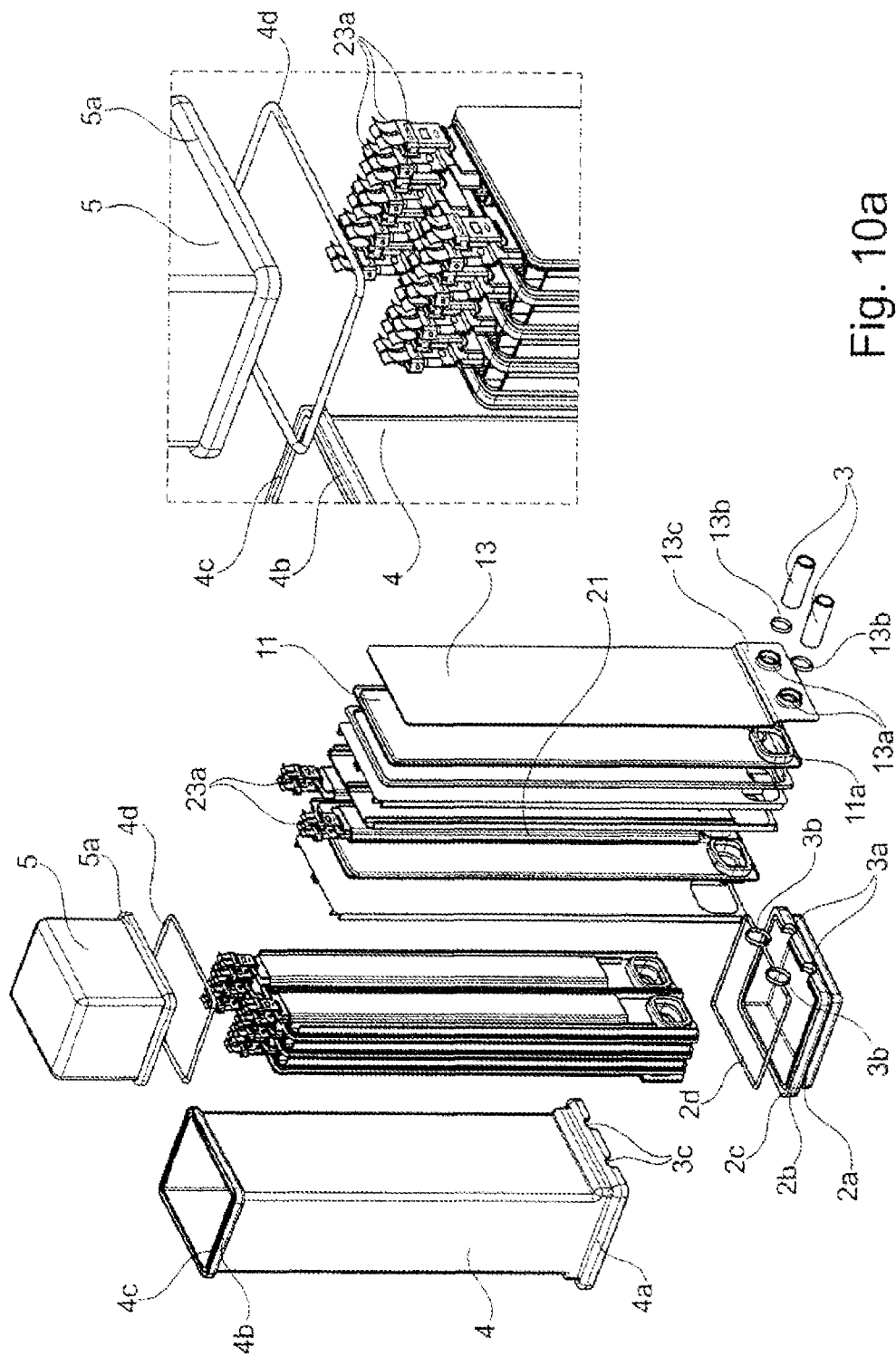
FIG. 10a shows, in perspective expanded views, an illustration for the integration of plate pairs and a heating composite having heating units in a housing for manufacture of a heating device according to FIG. 1.

FIG. 10a shows, in perspective expanded views, an illustration for the integration of plate pairs 21g and a heating composite 20 with heating units 21 in a housing 1 for manufacturing a heating device 100 according to FIG. 1. In addition to that shown in FIG. 10a, FIG. 10b shows, in an expanded perspective view and a partly cut-away view, an illustration for the integration of plate pairs 21g and a heating composite 20 with heating units 21 in a housing for manufacture of a heating device 100 according to FIG. 1.

The heating units 21 of prefabricated heating composites 20 are inserted between plate pairs 11g, as explained in greater detail with reference to the previous exemplary embodiments. Plate pairs 11g and heating composite 20 are introduced into a multi-part housing 1 according to FIG. 1. The various parts of the housing, that is to say the pedestal part 2, the middle part 4 and cap or top part 5 are interconnected, provided via seal elements 2d, 4d. The housing 1 is thus sealed outwardly, such that the heating device 100 is protected in a dust-tight and fluid-tight manner. The cap or top part 5 of the housing 1 is designed to also accommodate the power electronics, in particular the electrode connections 23a. An optional positioning frame, in particular a stenter frame, as described above, can preferably be integrated into the housing 1.

The heating device according to the invention, besides other advantages, is characterized in that the heating composite 20 with the heating units 21 and the components for the cooling liquid circuit, with plate pairs 11g, side parts 13, etc., can be separately produced and preassembled, independently of one another.

Protection against accidental contact is ensured for all externally contactable parts of the heating device.

The heating device is suitable for high-voltage operation up to 500 V and enables heating powers up to more than 5 kW, wherein an only relatively low number of heating elements are necessary.

Here, the heating device is constructed in a modular manner, that is to say can be modified in accordance with the desired heating power, and is characterized by a relatively low weight. Due to the possibility of installation of different numbers of plate pairs and optionally additional turbulence inserts, the heating device according to the invention enables a selective adjustment of pressure drops and flow rates on the liquid side with constant external dimensions of the heating device.

It is clear from the aspects discussed above that the heating device according to the invention thus allows different power stages selectable by a user.

The heating device can also be used as a low-voltage device, in which a contactable part may also be at a voltage potential, such as ground potential. The heating device can also be used as a high-voltage device, in which each contactable electrically conductive part is electrically galvanically isolated, such that these parts are not at voltage potential.

LIST OF REFERENCE SIGNS 1 housing
2 pedestal part
2a base part
2b connecting part
2c groove
2d seal element
3 connection piece for liquid inlet or outlet
3a recess
3b aperture ring
3c recess
4 middle part
4a lower end part of the middle part
4b upper end part of the middle part
4c groove
4d seal element
5 top part
5a lower end part of the top part
11 plate
11a opening
11c separating web
11d separating web end
11e plate end
11f plate dish
11g plate pair
11h insert part
11i spacing edge bar
11j spacing middle bar
11k insertion compartment
11l reusable insert part
11m integrated spacing bar
13 side part
13a opening
13b seal element
13c lower end part of the side part
15 positioning frame
15' positioning frame
20 heating composite
21 heating unit
22 heating element
22 PTC element
23 contact electrode
23a electrode connection
24 insulation
25 sheathing
25a kink region of the sheathing
25b heel region of the sheathing
25c press region of the sheathing
25d wall of the sheathing
25e inner wall of the sheathing
31 inlet direction for cooling liquid
32 outlet direction for cooling liquid
33 inflow direction
34 deflection direction
35 outflow direction
100 heating device
B plate width
$K_H$ half-height of a liquid flow channel
L plate length
$N_H$ plate dish height
Q transverse separation, distance between plate pair centers
$R_B$ outer plate pair thickness

The invention claimed is:

1. An electrically operable heating device, through which liquid is passed, comprising a housing, an electrically operable heating apparatus, and a liquid chamber for accommodating a heat-transferring liquid and allowing said liquid to flow through, wherein
the liquid chamber has a plurality of plate pairs consisting of two plates connected to one another at predefined distances, whereby liquid flow channels are produced in the plate pairs,
the plates have an inlet opening and an outlet opening to allow the heat-transferring liquid to flow into the liquid channels, and have a separating web starting from the inlet opening and the outlet opening, the separating web having an end at which the heat-transferring liquid flowing through can be diverted from an inflow direction into an outflow direction,
the plates, in regions of the inlet and outlet openings, have plate dishes which distance the plates, of different plate pairs from one another, arranged adjacently in the heating device, and
the electrically operable heating device is formed as a heating composite having heating units containing a plurality of heating elements, wherein the heating composite can be arranged in such a way between the liquid chambers by inserting the heating units into the accommodating spaces produced between the plate pairs.

2. The electrically operable heating device, through which liquid is passed, as claimed in claim 1,
wherein the heating units and the liquid flow channels are sealed in a fluid-tight manner and/or are electrically insulated with respect to one another.

3. The electrically operable heating device, through which liquid is passed, as claimed in claim 1,
wherein the two plates forming a plate pair are soldered to one another.

4. The electrically operable heating device, through which liquid is passed, as claimed in claim 1,
wherein the heating units are arranged in a sheathing and have PTC elements arranged centrally between two contact electrodes, wherein at least one electrical insulation is preferably provided between at least one contact electrode and the sheathing.

5. The electrically operable heating device, through which liquid is passed, as claimed in claim 1,
wherein the heating units have PTC elements arranged centrally between two contact electrodes, wherein at least one of the contact electrodes preferably has an electrical insulation for insulating with respect to the accommodating space for accommodating the heating unit.

6. The electrically operable heating device, through which liquid is passed, as claimed in claim 1,
wherein the housing is constructed of a number of housing parts, which can be interconnected in a dust-tight and fluid-tight manner via seal elements.

7. The electrically operable heating device, through which liquid is passed, as claimed in claim 1,
wherein plates of different plate pairs arranged adjacently in the heating device are distanced from one another by insert parts connected permanently to the plates, in particular soldered to the plates.

8. The electrically operable heating device, through which liquid is passed, as claimed in claim 1,
wherein plates, arranged adjacently in the heating device, of different plate pairs are distanced by means of spacing elements, which are integrated with the plates, are deformed from plates by folding and in particular are formed as spacing bars or nubs.

9. An electrically operable heating device, through which liquid is passed,
   comprising a housing, an electrically operable heating apparatus, and a liquid chamber for accommodating a heat-transferring liquid and allowing said liquid to flow through, wherein
   the liquid chamber has a plurality of plate pairs consisting of two plates connected to one another at predefined distances, whereby liquid flow channels are produced in the plate pairs,
   the plates have an inlet opening and an outlet opening to allow the heat-transferring liquid to flow into the liquid channels, and have a separating web starting from the inlet opening and the outlet opening, the separating web having an end at which the heat-transferring liquid flowing through can be diverted from an inflow direction into an outflow direction,
   the plates, in regions of the inlet and outlet openings, have plate dishes which distance the plates, of different plate pairs from one another, arranged adjacently in the heating device, and
   an insert part connected to the plates has two spacing edge bars, at which said insert part has been joined to plates of plate pairs such that insertion compartments are produced between the spacing bars and the adjacent plates of the plate pairs
   the electrically operable heating device is formed as a heating composite having heating units containing a plurality of heating elements, wherein the heating composite can be arranged in such a way between the liquid chambers by inserting the heating units into the accommodating spaces produced between the plate pairs.

10. The electrically operable heating device, through which liquid is passed, as claimed in claim 9,
   wherein the heating units and the liquid flow channels are sealed in a fluid-tight manner and/or are electrically insulated with respect to one another.

11. The electrically operable heating device, through which liquid is passed, as claimed in claim 9,
   wherein the plates have a separating web starting from the inlet opening and the outlet opening, the separating web having an end at which heat-transferring liquid flowing through can be diverted from an inflow direction into an outflow direction.

12. The electrically operable heating device, through which liquid is passed, as claimed in claim 9,
   wherein the two plates forming a plate pair are soldered to one another.

13. The electrically operable heating device, through which liquid is passed, as claimed in claim 9,
   wherein the heating units are arranged in a sheathing and have PTC elements arranged centrally between two contact electrodes, wherein at least one electrical insulation is preferably provided between at least one contact electrode and the sheathing.

14. The electrically operable heating device, through which liquid is passed, as claimed in claim 9,
   wherein the heating units have PTC elements arranged centrally between two contact electrodes, wherein at least one of the contact electrodes preferably has an electrical insulation for insulating with respect to the accommodating space for accommodating the heating unit.

15. The electrically operable heating device, through which liquid is passed, as claimed in claim 9,
   wherein the housing is constructed of a number of housing parts, which can be interconnected in a dust-tight and fluid-tight manner via seal elements.

16. The electrically operable heating device, through which liquid is passed, as claimed in claim 9,
   wherein plates of different plate pairs arranged adjacently in the heating device are distanced from one another by insert parts connected permanently to the plates, in particular soldered to the plates.

17. The electrically operable heating device, through which liquid is passed, as claimed in claim 9,
   wherein plates, arranged adjacently in the heating device, of different plate pairs are distanced by means of spacing elements, which are integrated with the plates, are deformed from plates by folding and in particular are formed as spacing bars or nubs.

* * * * *